US010169475B2

(12) United States Patent
Gong et al.

(10) Patent No.: US 10,169,475 B2
(45) Date of Patent: Jan. 1, 2019

(54) PATTERN FOR NAVIGATING CONTENT IN A PORTAL

(75) Inventors: Yixing Gong, New Britain, CT (US); Richard Daniel Margetic, Volente, TX (US)

(73) Assignee: International Business Machines Corporation, Armonk, NY (US)

( * ) Notice: Subject to any disclaimer, the term of this patent is extended or adjusted under 35 U.S.C. 154(b) by 3205 days.

(21) Appl. No.: 11/283,344

(22) Filed: Nov. 17, 2005

(65) Prior Publication Data

US 2007/0124701 A1 May 31, 2007

(51) Int. Cl.
G06F 17/30 (2006.01)

(52) U.S. Cl.
CPC .... G06F 17/30873 (2013.01); G06F 17/3089 (2013.01)

(58) Field of Classification Search
CPC .............. G06F 17/30864; G06F 17/30867
USPC ............. 707/1, 2, 3, 6, 9, 10, 101, 102, 705
See application file for complete search history.

(56) References Cited

U.S. PATENT DOCUMENTS

| | | | | |
|---|---|---|---|---|
| 7,788,274 B1* | 8/2010 | Ionescu | ............. | G06F 17/30873 707/763 |
| 2001/0035885 A1* | 11/2001 | Iron | ...................... | G06F 3/0481 715/855 |
| 2003/0009564 A1* | 1/2003 | Eckel | ............................ | 709/227 |
| 2003/0018622 A1* | 1/2003 | Chau | .................. | G06F 17/30873 |
| 2003/0115333 A1* | 6/2003 | Cohen et al. | ................. | 709/227 |
| 2003/0144892 A1* | 7/2003 | Cowan et al. | ..................... | 705/8 |
| 2004/0073572 A1* | 4/2004 | Jiang | .................. | G06Q 30/0603 |
| 2004/0083265 A1* | 4/2004 | Beringer | ....................... | 709/204 |
| 2004/0090969 A1* | 5/2004 | Jerrard-Dunne et al. | ................... | 370/395.54 |
| 2004/0133660 A1* | 7/2004 | Junghuber et al. | ........... | 709/219 |
| 2004/0230947 A1* | 11/2004 | Bales et al. | .................... | 717/110 |
| 2005/0021532 A1* | 1/2005 | Ghandour | ..................... | 707/100 |
| 2005/0021765 A1* | 1/2005 | Flores et al. | ................. | 709/228 |
| 2005/0114789 A1* | 5/2005 | Chang | ................... | G06F 3/0481 715/779 |
| 2006/0005163 A1* | 1/2006 | Huesken et al. | ............. | 717/107 |
| 2006/0095835 A1* | 5/2006 | Kennedy | .............. | G06F 17/211 715/234 |
| 2006/0129935 A1* | 6/2006 | Deinlein et al. | ............. | 715/733 |

FOREIGN PATENT DOCUMENTS

| | | | | |
|---|---|---|---|---|
| WO | WO 2004/031985 A2 | 4/2004 | ............ | G06F 17/30 |
| WO | WO 2004/031987 A2 | 4/2004 | ............ | G06F 17/30 |

* cited by examiner

*Primary Examiner* — Syling Yen
*Assistant Examiner* — Bao G Tran
(74) *Attorney, Agent, or Firm* — Yee & Associates, P.C.; Maeve Carpenter

(57) ABSTRACT

A computer implemented method for navigating content in a portal. Category information is obtained for a portal. The category information is displayed in the navigation portlet to form displayed category information. Content information is obtained for the portal. The content information is displayed in the content viewer portlet to form displayed content information, wherein the navigation portlet and the content viewer portlet communicate to each other to update displayed category information and displayed content information after a user action.

6 Claims, 9 Drawing Sheets

PATTERN FOR NAVIGATING CONTENT IN A PORTAL

BACKGROUND OF THE INVENTION

1. Field of the Invention

The present invention relates generally to an improved data processing system, in particular, to a computer implemented method, portal application system, and computer program product for optimizing performance in a data processing system. Still more particularly, the present invention provides a computer implemented method, portal application system, and computer program product of a pattern for navigating content in a portal.

2. Description of the Related Art

A portal is a Web site that aims to be an entry point to other Web sites and back-end applications. A portal typically offers a search engine and/or links to useful pages, and possibly news or other services. These services are usually provided for free in the hope that users will make the site their default home page or at least visit it often. Popular examples are Yahoo!® and MSN®, the Microsoft® Network. Yahoo!® is a registered trademark of Yahoo! Inc. in the United States and/or other countries. MSN® and Microsoft® are registered trademarks of Microsoft Corporation in the United States and/or other countries.

A portlet is a Web-based application that processes requests and generates dynamic content. The end-user essentially sees a portlet as a specialized content area within a portal page. Depending on the content nature of the portlet, the user may use this area to view different types of content such as travel information, business news, or even local weather. A portal provides users with the capability to customize content, appearance and position of a portlet.

A portal usually has some portlets to connect to back-end content management systems to display content items, such as news. These portlets display content items and use links to connect to other content items. Without an intuitive navigation box, a user does not have an overall view of these content items. After several clicks on the links, a user may lose his position in these content items, such that the user does not know the context of the current content item or how this content item is related to other content items.

Users are accustomed to graphical user interfaces provided by computer applications. For example, most users use Windows® Explorer to view folders and files instead of issuing the Microsoft® Disk Operating System (MS-DOS®) command "dir" to view folders and files. Windows® and MS-DOS® are registered trademarks of Microsoft Corporation in the United States and/or other countries. A Portal provides tools to create pages and labels, and a menu to navigate through these pages and labels. But this menu is only available to the portal itself, as it cannot be applied by a portlet to navigate its own content.

Without a navigation box connecting to content items, the usual way a portlet displays content items is not friendly to users.

SUMMARY OF THE INVENTION

The present invention is a computer implemented method, portal application system, and computer program product in a data processing system to present a pattern for navigating content in a portal. Category information is obtained by a navigation portlet. The category information is displayed in the navigation portlet to form displayed category information. Content information is obtained by a content viewer portlet. The content information is displayed in the content viewer portlet to form displayed content information, wherein the navigation portlet and the content viewer portlet communicate to each other to update displayed category information and displayed content information after a user action.

BRIEF DESCRIPTION OF THE DRAWINGS

The novel features that are believed characteristic of the invention are set forth in the appended claims. The invention itself as well as an illustrative mode of use, further objectives and advantages thereof, will best be understood by reference to the following detailed description of illustrative embodiments of the present invention when read in conjunction with the accompanying drawings, wherein:

DETAILED DESCRIPTION OF THE PREFERRED EMBODIMENT

Figure 1:
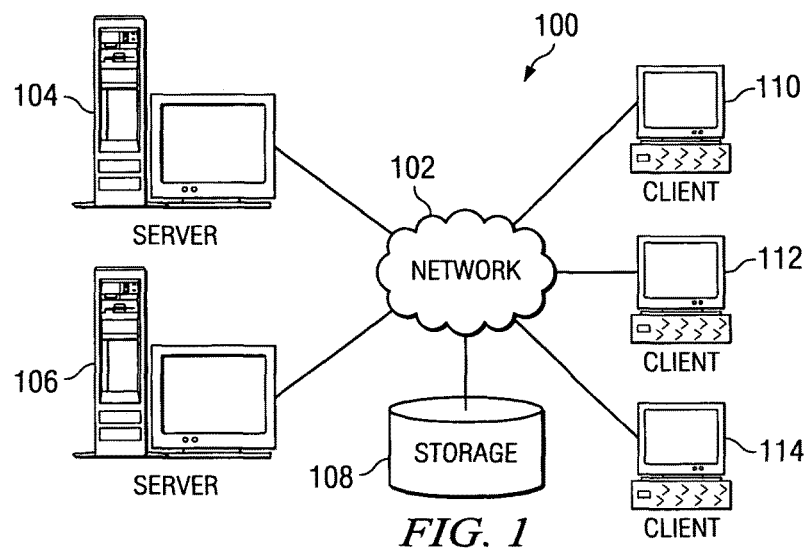
FIG. 1 is a pictorial representation of a network of a data processing system in accordance with an illustrative embodiment of the present invention.
Figure 2:
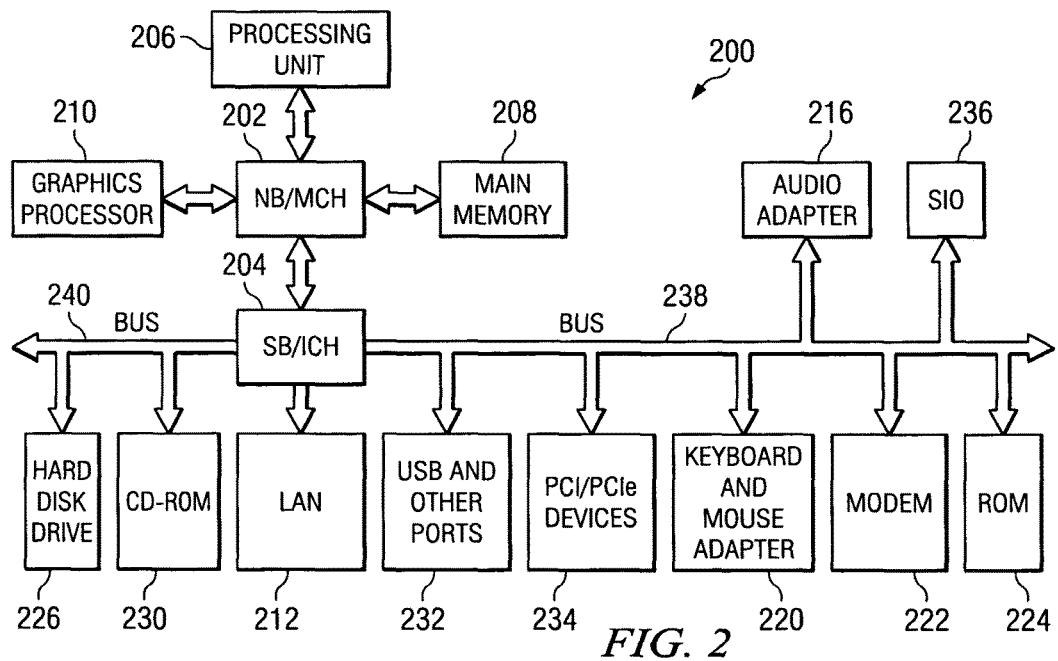
FIG. 2 is a block diagram of a data processing system in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 and server 106 provide data, such as boot files, operating system images, and applications to clients 110, 112, and 114. Clients 110, 112, and 114 are clients to server 104 and server 106 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate to one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP. Microsoft® and Windows® are registered trademarks of Microsoft Corporation in the United States and/or other countries. An object-oriented programming system, such as the Java™ programming system, may run in conjunction with the operating system and provides calls to the operating system from Java™ programs or applications executing on data processing system 200. Java® is a registered trademark of Sun Microsystems, Inc. in the United States and/or other countries.

As a server, data processing system 200 may be, for example, an IBM® eServer™ pSeries® computer system, running the Advanced Interactive Executive (AIX®) operating system or LINUX® operating system. eServer®, pSeries® and AIX® are registered trademarks of International Business Machines Corporation in the United States and/or other countries, while LINUX® is a registered trademark of Linus Torvalds in the United States and/or other countries. Data processing system 200 may be a symmetric multiprocessor (SMP) system including a plurality of processors in processing unit 206. Alternatively, a single processor system may be employed.

Instructions for the operating system, the object-oriented programming system, and programs or applications are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communication fabric or architecture that provides a data transfer between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2.

The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention provide a portal developer with a pattern for navigating content in a portal. Using this pattern, a portlet developer may create a navigation box in a navigation portlet and associate this navigation box with content items in a content viewer portlet so that in the portal environment a user may navigate content items in the same way as the user navigates folders and files in the Windows environment. A content item is an item associated with specific content. These two portlets applying the navigation box to navigate content items make a portal Web site much easier for a user to use.

The pattern provided by embodiments of the present invention provides a user-friendly approach for portal users to navigate content items. Using this pattern to develop a navigation portlet and a content viewer portlet also ensures the quality of those two portlets and saves time and cost for such a content management portal project.

Portlets are connected to a content management system to access content. A content management system is a computer tool used to organize and facilitate the collaborative creation of content such as documents. A content management system is frequently a Web application used for managing content, though in other cases, a content management system requires a special client tool for editing and constructing articles. There are several types of content management systems. A Web content management system assists an organization in automating various aspects of Web content. A transactional content management system assists an organization to manage e-commerce transactions. In a content management system, taxonomy is used to categorize concepts and to organize content items by assigning content items into a category or categories based upon a logical grouping of the related concept or concepts associated with each content item. Taxonomy is usually presented as a tree structure. The navigation box uses an internal tree data structure to map categories and documents of a taxonomy tree structure in the real world directly into folders and files in the computing world. The pattern for navigating content provided by embodiments of the present invention creates a navigation box in a navigation portlet and associates content items with this navigation box in a content viewer portlet to map the taxonomy implemented by a content management system directly into a computer graphical user interface.

Figure 3:
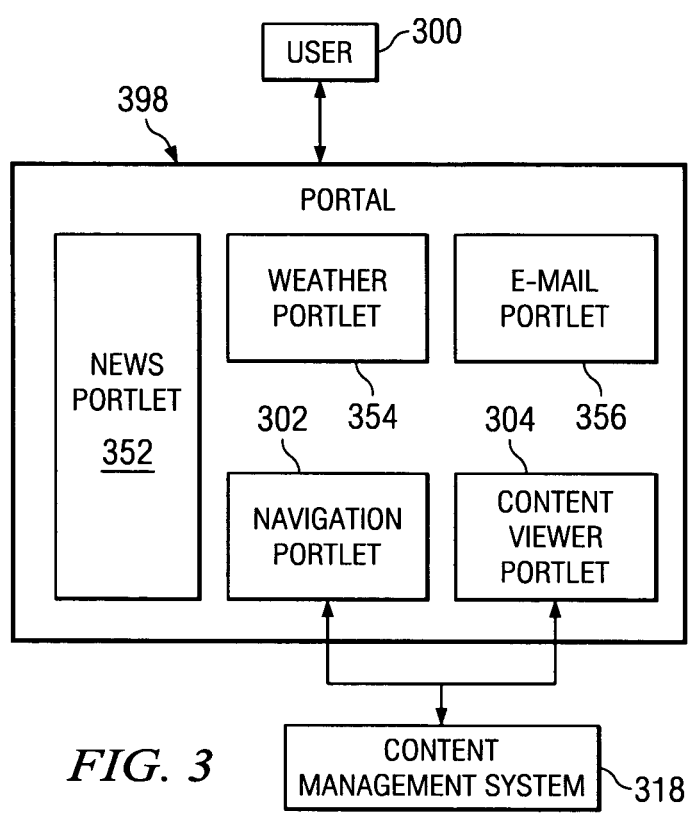
FIG. 3 is a block diagram illustrating an example of a portal containing portlets using this invention to navigate content in accordance with an illustrative embodiment of the present invention.

FIG. 3 is a block diagram illustrating an example of a portal containing portlets used for navigating content in accordance with an illustrative embodiment of the present invention. Portal 398 may contain many portlets, including news portlet 352, weather portlet 354, e-mail portlet 356, navigation portlet 302 and content viewer portlet 304. Portal 398 may be implemented using components of a network of a data processing system in FIG. 1, such as clients 110, 112, or 114. Navigation portlet 302 and content viewer portlet 304 are connected to content management system 318. Content management system 318 may be implemented using components of a network of the data processing system in FIG. 1, such as server 104 or server 106. User 300 may use portal 398 to access news portlet 352, weather portlet 354, e-mail portlet 356, navigation portlet 302 and content viewer portlet 304. Embodiments of the present invention use navigation portlet 302 and content viewer portlet 304 to assist user 300 to navigate content accessed from content management system 318.

Figure 4:
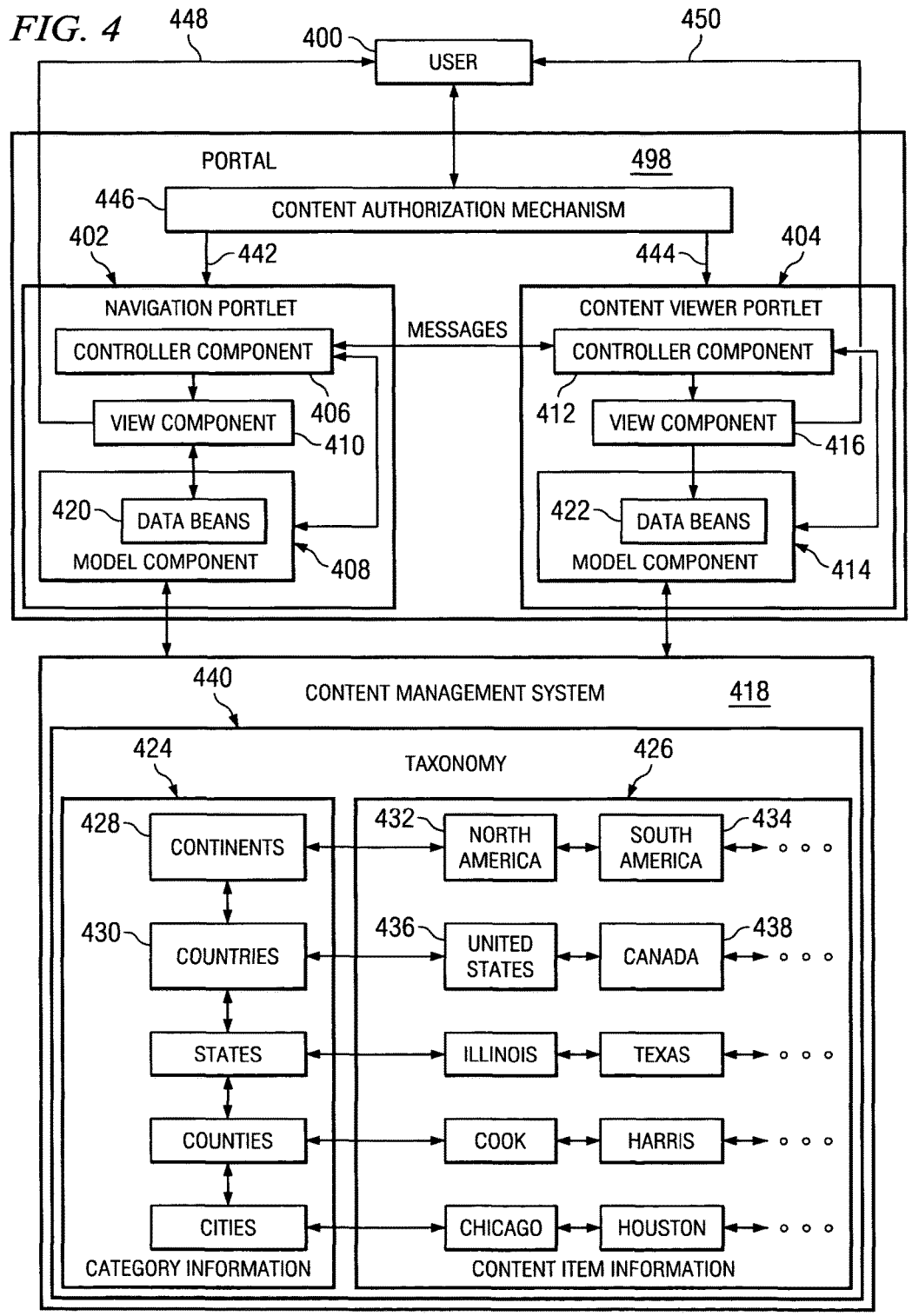
FIG. 4 is a block diagram illustrating examples of components used by the pattern for navigating content in a portal in accordance with an illustrative embodiment of the present invention.

FIG. 4 is a block diagram illustrating examples of components used for navigating content in a portal. User 400, which may be the same as user 300 in FIG. 3, uses portal 498, which may be the same as portal 398 in FIG. 3, which contains navigation portlet 402 and content viewer portlet 404, which may be the same as navigation portlet 302 and content viewer portlet 304 in FIG. 3. A content viewer portlet is a portlet that enables a user to view content or content items. Navigation portlet 402, which may be the same as navigation portlet 302 in FIG. 3, and content viewer portlet 404, which may be the same as content viewer portlet 304, apply the Model-View-Controller pattern, each which comprises three components. Navigation portlet 402 has controller component 406, model component 408, and view component 410. Content viewer portlet 404 has controller component 412, model component 414, and view component 416. The model components 408 and 414 of navigation portlet 402 and content viewer portlet 404 are used to connect to a content management system, such as content management system 418, which may be the same as content management system 318 in FIG. 3, to retrieve information, and to store information. The view components 410 and 416 of navigation portlet 402 and content viewer portlet 404 are used to retrieve stored information and display the information. Controller components 406 and 412 of navigation portlet 402 and content viewer portlet 404 send messages to each other to make these two portlets work together.

Controller component 406 of navigation portlet 402 can send messages to controller component 412 of content viewer portlet 404 to make sure that the information retrieved by content viewer portlet 404 corresponds to the information retrieved by navigation portlet 402. In response to an action of a user in navigation portlet 402, information in navigation portlet 402 is updated and the corresponding information in content viewer portlet 404 is also updated accordingly, such that the information retrieved by content viewer portlet 404 corresponds to the information retrieved by navigation portlet 402. Likewise, in response to an action of a user in content viewer portlet 404, information in content viewer portlet 404 is updated and the corresponding information in navigation portlet 402 is also updated accordingly, such that the information retrieved by navigation portlet 402 corresponds to the information retrieved by content viewer portlet 404.

When an illustrative embodiment of the present invention is used for viewing content retrieved from content management system 418, model component 408 of navigation portlet 402 is used to connect to content management system 418. Model component 408 retrieves category information 424, and stores category information 424 into data beans 420. A data bean is a reusable software component. Category information, such as category information 424, is a classification assigned to an item that indicates the higher level grouping to which the item belongs. Using a geography example, the highest level of category information is continents; the next highest level, or sub-category below continents, is countries; and the sub-category below countries is states or provinces. Sub-categories below states include counties and cities. View component 410 of navigation portlet 402 retrieves category information 424 from data beans 420, formats the category information for display, and displays 448 the category information 424 to user 400 as category folders in navigation portlet 402. Following the previous geographic example, the top level of category folders is continents category folder 428, and the sub-category level below the continents level is countries category folder 430.

Model component 414 of content viewer portlet 404 also connects to content management system 418. Model component 414 retrieves content item information 426 rather than category information 424, and stores content item information 426 into data beans 422. Content item information, such as content item information 426, is information that includes content items associated with a specific category. Continuing the previous geographic example, the content item information associated with continents category folder 428 includes North America 432 and South America 434, and the content item information associated with countries category folder 430 includes United States 436 and Canada 438. Taxonomy 440 depicts all of the relationships between category information 424 and content item information 426. View component 416 of content viewer portlet 404 retrieves the content item information from data beans 422, formats the content item information for display, and displays 450 content item information 426 to user 400 as content items in content viewer portlet 404.

When action 442 of user 400 occurs on a category folder in navigation portlet 402, category folder 424 is updated by expanding or collapsing in navigation portlet 402. At the same time, controller component 406 of navigation portlet 402 sends a category identification to controller component 412 of content viewer portlet 404, and content item information 426 displayed in content viewer portlet 404 is also updated accordingly. When action 444 of user 400 occurs on content item information 426, the content item information 426 in content viewer portlet 404 is updated. At the same time, controller component 412 of content viewer portlet 404 sends a category identification to controller component 406 of navigation portlet 402, and the folders for category information 424 displayed in navigation portlet 402 are updated accordingly. In this way, user 400 may use the folders displayed in navigation portlet 402 for category information 424 to navigate content item information 426 displayed in content viewer portlet 404.

Figure 5:
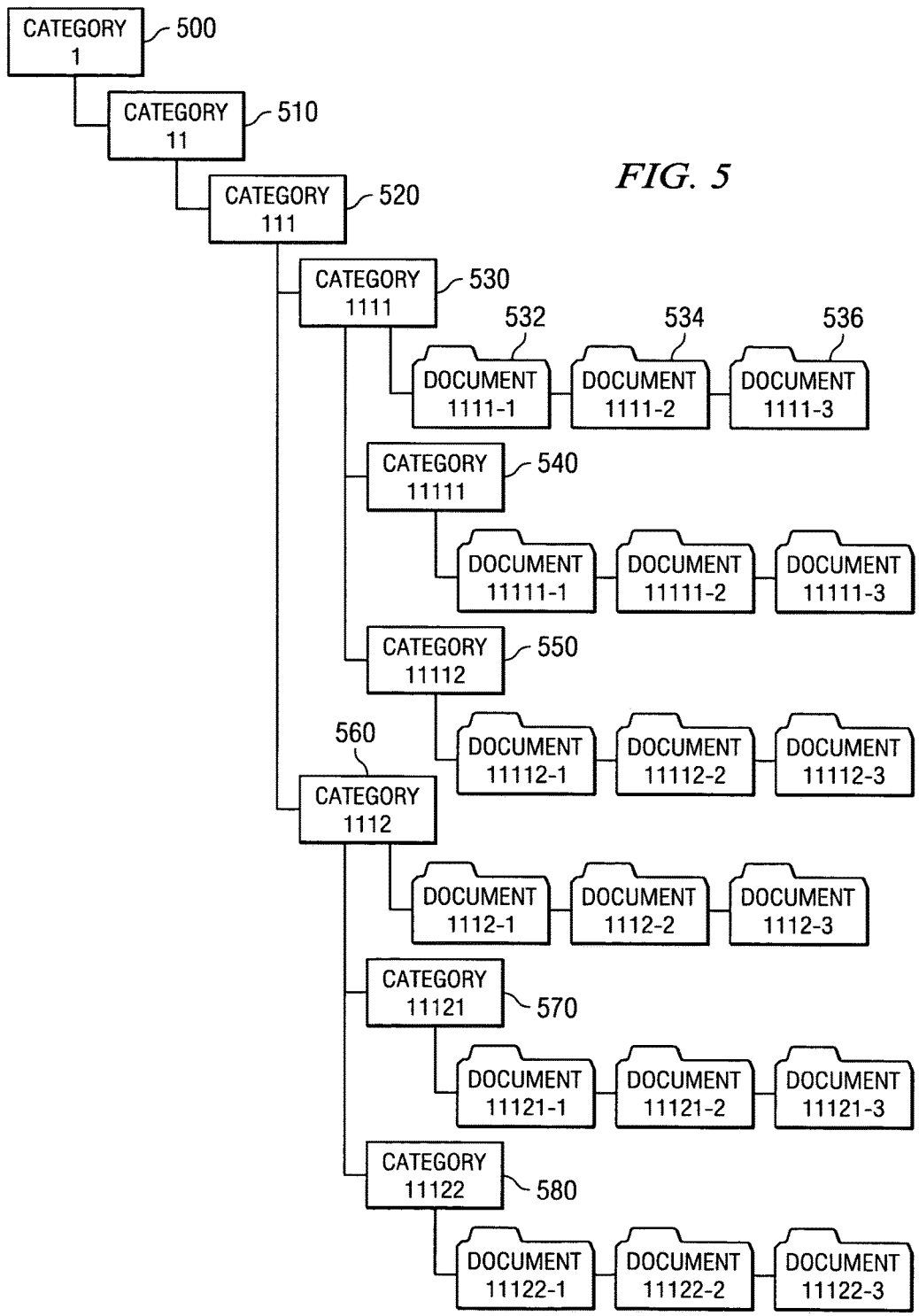
FIG. 5 is a block diagram illustrating an example of a taxonomy tree organizing categories and documents in accordance with an illustrative embodiment of the present invention.

For user-friendly navigation, the folders for category information 424 in navigation portlet 402 must be well organized based on intuitive classifications. Taxonomy is a presentation of the way that information collected from the real world is turned into well organized and intuitive classifications. FIG. 5 is a block diagram illustrating an example of using taxonomy to organize category information, such as category information 424 in FIG. 4, and content item information, such as content item information 426 in FIG. 4, according to an illustrative embodiment of the present invention. In this illustrative example, taxonomy is presented as a data structure, such as a tree structure, with each node of the tree presenting a concept through which the real world is modeled. The taxonomy illustrated in FIG. 5 may be used to implement any tree-based taxonomy, such as taxonomy 440 depicted in FIG. 4. Although this example uses tree structures, embodiments of the present invention may use other data structures as well. If a concept is refined by further concepts, then the associated node, such as category 530, has child nodes, such as category 540 and category 550, to present the refined concepts. Each node of this tree is a category in taxonomy. Content items in the real world are classified according to concepts and they are associated with one or more categories, such as those used in taxonomy. Using this taxonomy, each content item is shown as a document, such as document 532, document 534, and document 536.

The navigation portlet, such as navigation portlet 402 in FIG. 4, is used to display categories of a taxonomy tree structure as category folders in the navigation portlet. Categories that may be associated with categories and content items are displayed in a content viewer portlet, such as content viewer portlet 404 in FIG. 4. These category folders may be updated by expanding to display the category folders at the next level or collapsing to hide the category folders at the next level.

It is not necessary for a category in a taxonomy tree structure to be associated with documents. These categories are used for concept classification. In this case, these top level categories may be implemented as pages in a portal. For example, the top level category, category 500, may be implemented as a page in a portal, and the categories such as category 510, category 520, . . . category 560, category 570, category 580 may be implemented as sub-pages of the page category 500 at the next level.

Figure 6:
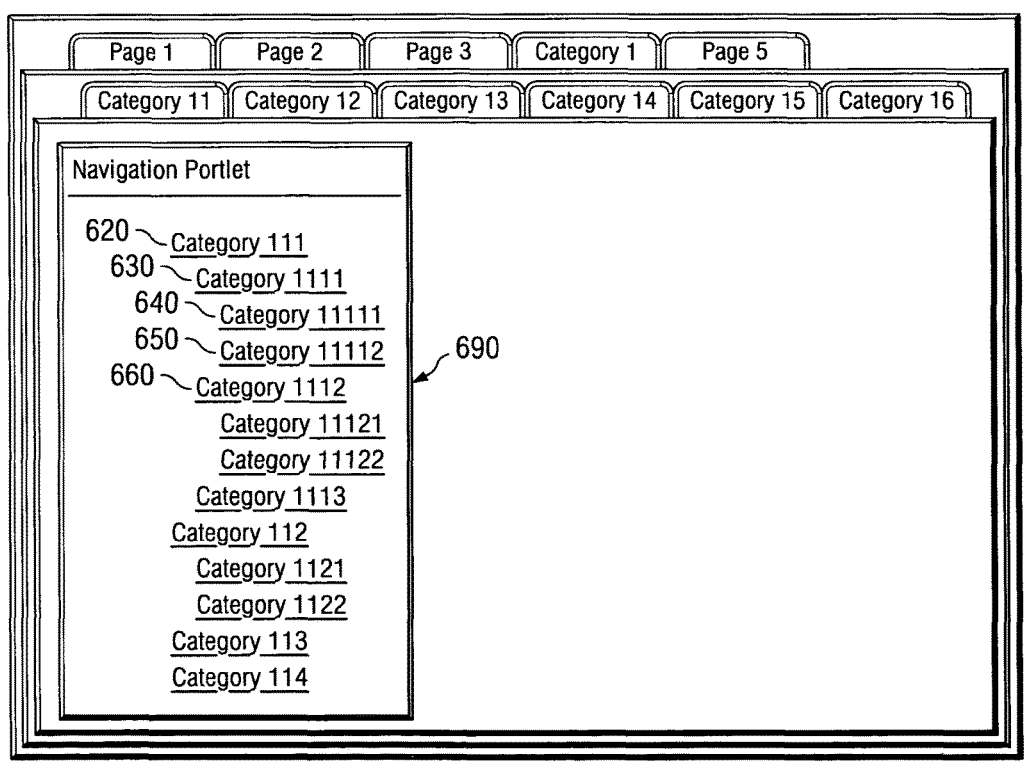
FIG. 6 is a block diagram illustrating an example of a navigation portlet displaying category information in accordance with an illustrative embodiment of the present invention.

FIG. 6 is a block diagram illustrating an example of a navigation portlet for navigating content in a portal, according to an illustrative embodiment of the present invention. Navigation portlet 690 displays categories beginning with category 620 folder, which may be the same category as category 520 in FIG. 5. When category 620 folder is updated by expanding, category 630 folder and category 660 folder are displayed. When category 630 folder is updated by expanding, the sub-folders for category 640 folder and category 650 folder are displayed under the folder for category 630 in turn. This process can continue until the categories at the leaf nodes are displayed.

The navigation portlet has a configuration page. In that page a portal administrator, an individual managing a portal Web site, can pre-configure this portlet with a category, which is the top folder in the navigation portlet. When a user, such as user 400 in FIG. 4, logs into this portal Web site, the controller, such as controller component 406, of the navigation portlet gets this pre-configured category and sends the category to the model component, such as model component 408. The model component retrieves the category information of that category and all categories under that category, and the view component, such as view component 410, displays these categories in the navigation portlet. Later on, the display in this navigation portlet is updated by user actions, such as action 442, on category folders displayed in the navigation portlet. When a user commits an action, the controller component, such as controller component 406, sends the request for the new category to the model component in order to update the displayed category levels. The controller component of the navigation portlet also sends a message to the controller component, such as controller component 412 of the content viewer portlet, such as content viewer portlet 404, to make sure that when the category information retrieved by the navigation portlet is updated, the corresponding categories and content items displayed by the content viewer portlet are updated accordingly.

The content viewer portlet is used to display selected categories and their associated content items at two levels. When a user action occurs on a category in the navigation portlet, this category, its associated content items and its directly contained sub-categories and their associated content items are displayed in the content viewer portlet, updating the content viewer portlet.

Figure 7:
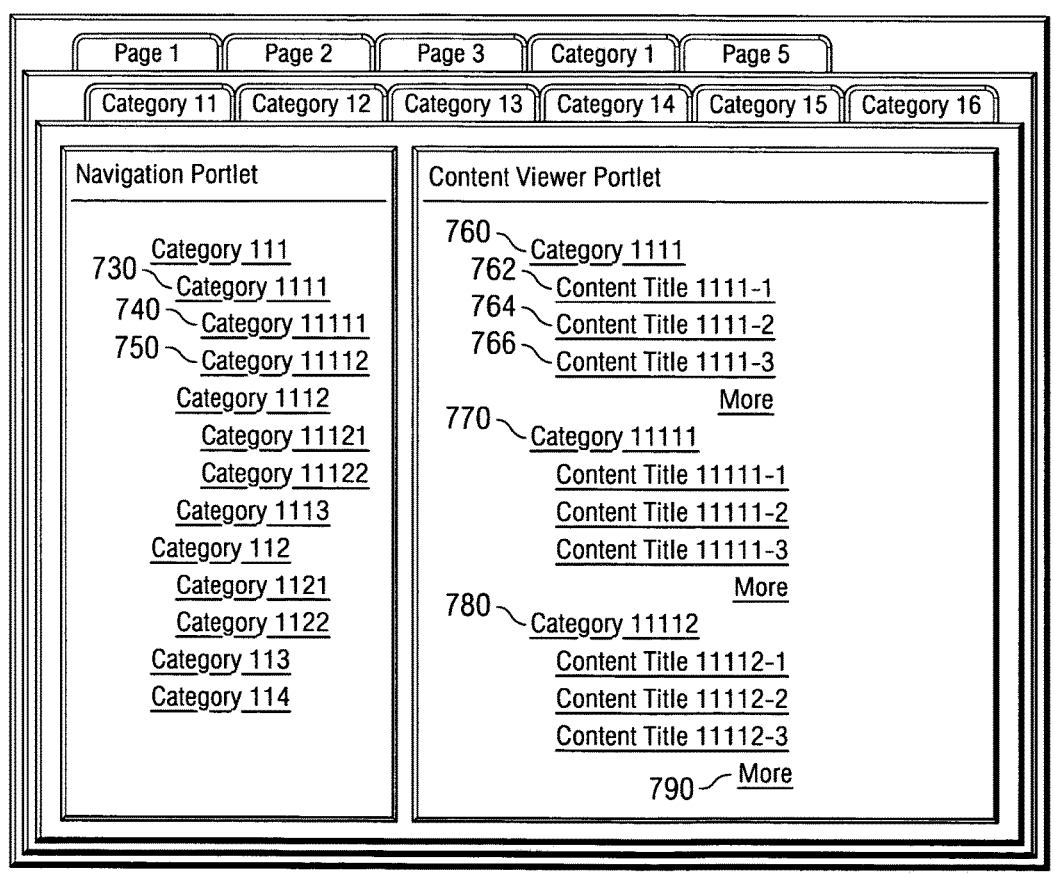
FIG. 7 is a block diagram illustrating an example of the first page of a content viewer portlet displaying content information in accordance with an illustrative embodiment of the present invention.

FIG. 7 is a block diagram illustrating an example of a display in a content viewer portlet, according to an illustrative embodiment of the present invention. Category 730, category 740, and category 750 may be the same as category 630, category 640, and category 650 in FIG. 6, respectively. In this illustrative example, when a user action, such as action 442 in FIG. 4, occurs on a folder, for example category 730 in the navigation portlet, category 760 and its two sub-categories, category 770 and category 780, are displayed in the content viewer portlet, updating the content viewer portlet. The content items associated with these three categories are also displayed under their corresponding category respectively. For example, content title 762, content title 764, and content title 766 are all titles of content items, and displayed under category 760.

The controller component of the content viewer portlet may also send a message back to the controller component of the navigation portlet. When a user action occurs on a category, for example, category 760, the controller component of the content viewer portlet updates its content items, and then sends category 760 identification to the controller component of the navigation portlet. The controller component of the navigation portlet uses category 760 identification to update the navigation portlet by highlighting the category 730 folder. If category 730 has sub-categories, the navigation portlet displays all sub-categories under category 730.

The content viewer portlet displays content items in three pages. FIG. 7 illustrates an example of the first page of the content viewer portlet. In this page, the content viewer portlet displays only a limited number of content items for each category. At the end of each category section, there is a "more" link, such as more 790. When a user action occurs on this "more" link, the content viewer portlet updates by displaying a second page, illustrated by FIG. 8.

Figure 8:
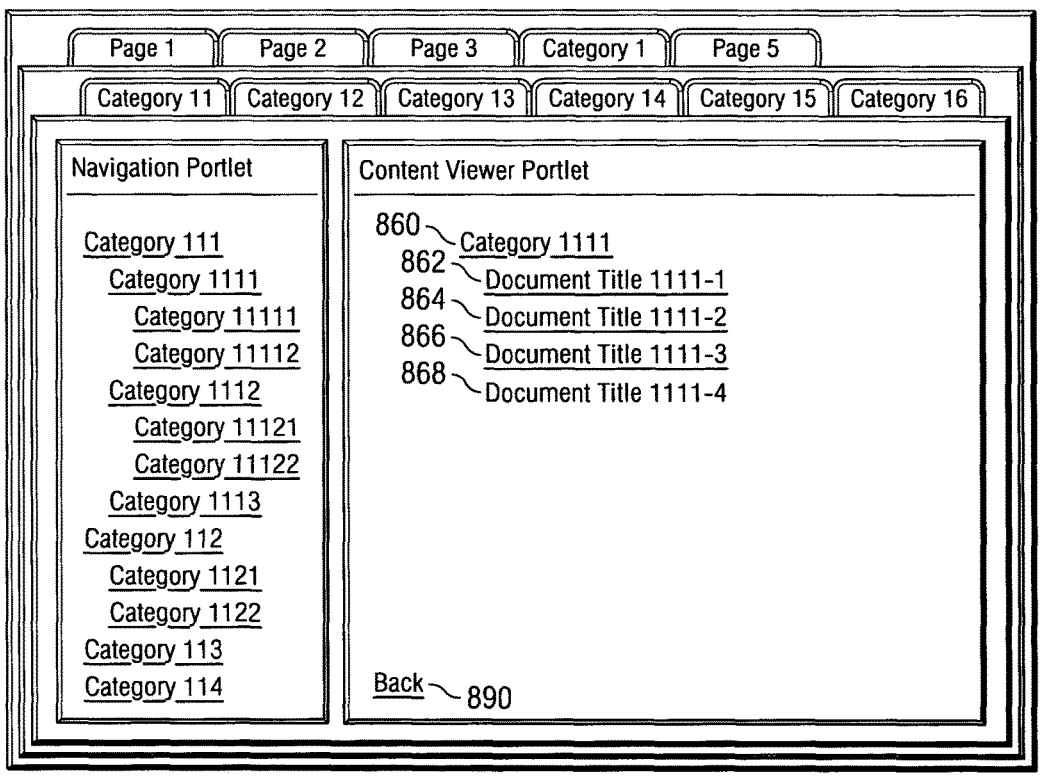
FIG. 8 is a block diagram illustrating an example of the second page of a content viewer portlet displaying content information in accordance with an illustrative embodiment of the present invention.

FIG. 8 is a block diagram illustrating an example of the second page of a content viewer portlet, according to an illustrative embodiment of the present invention. In this second page, the content viewer portlet displays only one category and all its associated content items. For example, document titles 862 through 868 are listed under category 860, which may be the same category as category 760 in FIG. 7. A "back" link 890 is at the end of this page. When a user action, such as action 444 in FIG. 4, occurs on the back link, the content viewer portlet updates by returning to the first page.

Figure 9:
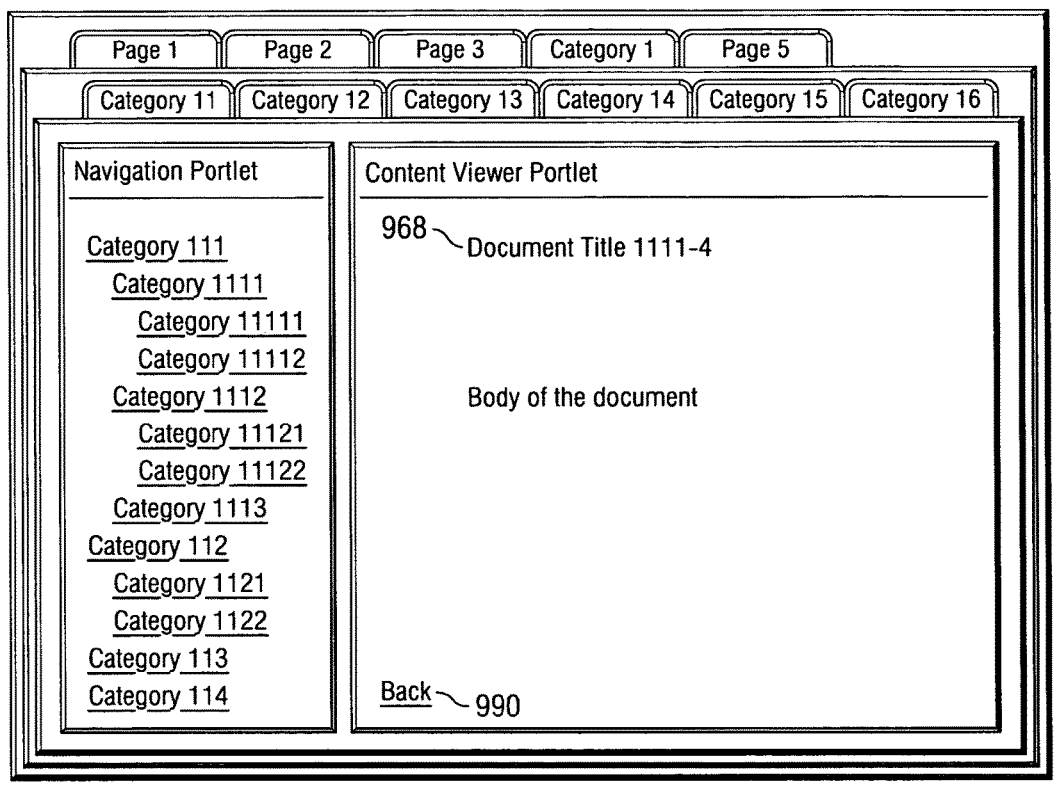
FIG. 9 is a block diagram illustrating an example of the third page of a content viewer portlet displaying content information in accordance with an illustrative embodiment of the present invention.

Whether in the first page or the second page, when a user action, such as action 444 in FIG. 4, occurs on a document title, the content viewer portlet updates by displaying the third page, illustrated by FIG. 9, the details of one content item. FIG. 9 is a block diagram illustrating an example of the third page of a content viewer portlet, according to an illustrative embodiment of the present invention. Document title 968 may be the same as document title 868 in FIG. 8. A back link, such as back link 990, is also on the third page. When a user action occurs on this back link, the content viewer portlet returns to the previous page, depending on which page preceded the third page.

A content viewer portlet, such as content viewer portlet 404 in FIG. 4, also has an implementation of a configuration page. A portal administrator can use this configuration page to pre-figure this content viewer portlet with a category. When a user, such as user 400, logs into a portal Web site, the controller component of the content viewer portlet retrieves this pre-figured category, all of its next level sub-category information, and all the associated content item information. Then the content viewer portlet displays the retrieved content item information in the first page of the content viewer portlet. After this initialization, this content viewer portlet updates its contents, either driven by the user actions in the navigation portlet, such as action 442, or driven by the user actions in the three pages of the content viewer portlet, such as action 444.

A portal administrator can also use this configuration page to set the number of displayed content items in the first page of a content viewer portlet. When the content viewer portlet displays the first page, the controller component of the content viewer portlet retrieves this pre-figured number and displays that number of content items under each category.

Figure 10:
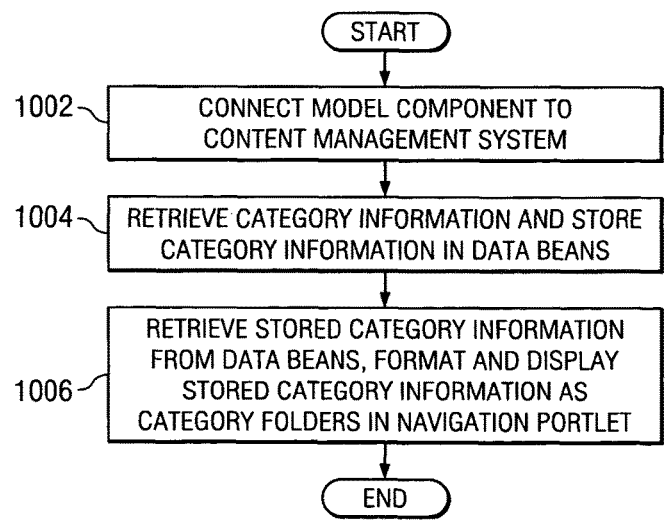
FIG. 10 is a flowchart illustrating a process for displaying category information in a navigation portlet in accordance with an illustrative embodiment of the present invention.

FIG. 10 is a flowchart illustrating a process for displaying category information in a navigation portlet, according to an illustrative embodiment of the present invention. When this process is used for viewing categories from a content management system, a navigation portlet connects the model component to a content management system (step 1002). The navigation portlet may be navigation portlet 402 in FIG. 4 and the model component may be model component 408 in FIG. 4. The model component of the navigation portlet retrieves category information, and stores the category information into data beans (step 1004). The view component of the navigation portlet retrieves the category information from the data beans, formats and displays the stored category information as category folders in the navigation portlet (step 1006). The view component may be view component 410 in FIG. 4.

Figure 11:
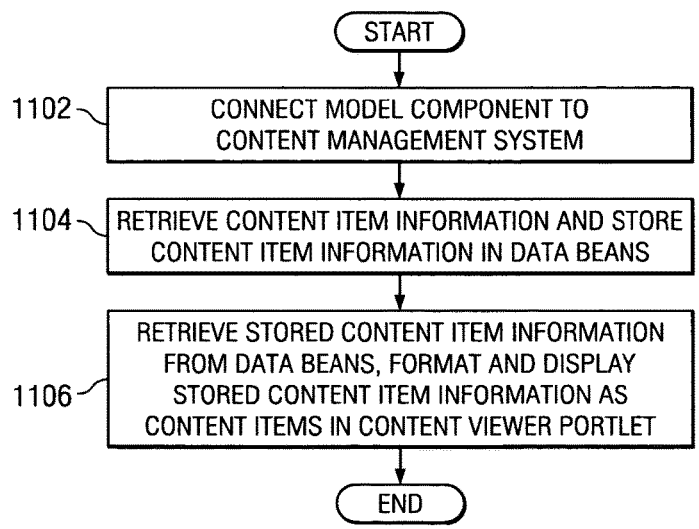
FIG. 11 is a flowchart illustrating a process for displaying content information in a content viewer portlet in accordance with an illustrative embodiment of the present invention.

FIG. 11 is a flowchart illustrating a process for displaying content item information in a content viewer portlet, according to an illustrative embodiment of the present invention. When this process is used for viewing content items from a content management system, the content viewer portlet connects the model component to a content management system (step 1102). The content viewer portlet may be content viewer portlet 404 in FIG. 4 and the model component may be model component 414 in FIG. 4. The model component of the content viewer portlet retrieves the content item information and stores the content item information into data beans (step 1104). The view component of the content viewer portlet retrieves the content item information from the data beans, formats and displays the stored content item information as content items in the content viewer portlet (step 1106). The view component may be view component 416 in FIG. 4.

Figure 12:
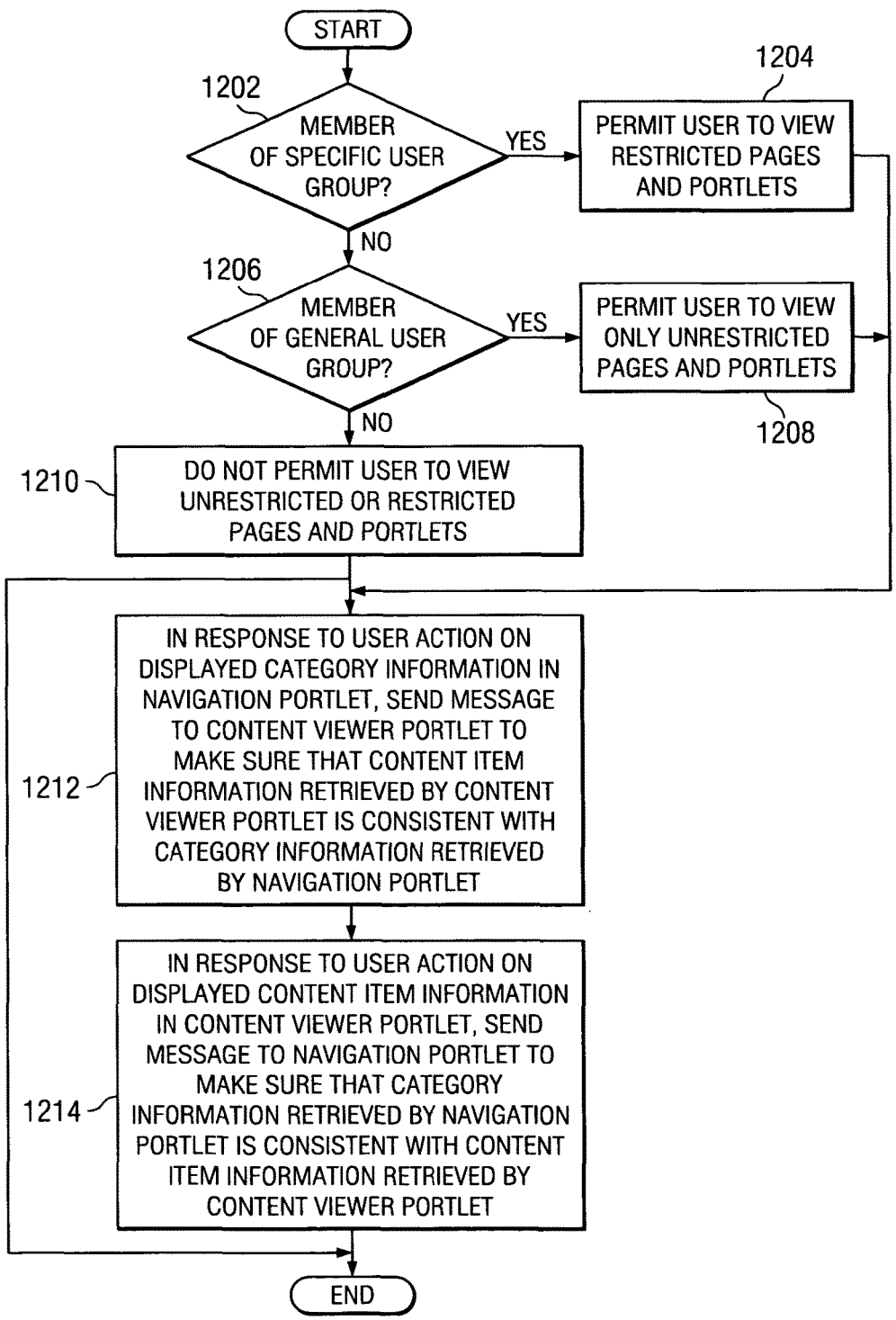
FIG. 12 is a flowchart illustrating a process for a portal to use a navigation portlet to display category information and a content viewer portlet to display content information in accordance with an illustrative embodiment of the present invention.

FIG. 12 is a flowchart illustrating a portal using a navigation portlet and a content viewer portlet, according to an illustrative embodiment of the present invention. Both the pages and the portlets are assets of a portal. These assets can be assigned to a user group so that only users belonging to that user group, such as user 400 in FIG. 4, may have access to view these pages and portlets. When a portal administrator manages a portal Web site, if some categories and content items are only available to some group of users, the portal administrator may apply the content authorization feature of a portal to pages and portlets. A content authorization mechanism is a mechanism that determines if a user has authorization to access the pages and portlets of a portal.

In the taxonomy tree structure, the information architect separates the categories, which are available to a general group of users, from the categories, which are available only to a specific group of users. The pattern for navigating content described above is used to create, for example, two pages, an unrestricted page and a restricted page, and on each page there is a pair of a navigation portlet and a content viewer portlet. The unrestricted page is assigned to a general user group, and the restricted page is assigned to a specific user group.

When a user, such as user 400 in FIG. 4, logs into this portal Web site, the content authorization mechanism, such as content authorization mechanism 446 in FIG. 4, determines if the user is a member of a specific user group (step 1202). If the content authorization mechanism determines the user is a member of the specific user group, the content authorization mechanism permits the user to view the restricted pages of this portal (step 1204). The restricted pages are pages that provide the user of the specific user group with access to restricted category information and restricted content information, which includes unrestricted category information and unrestricted content information that a user of a general user group may access and restricted category information and restricted content information that a user of a general user group may not access. Content information includes information about content item information, specific information about content items and general information about content. If the content authorization mechanism determines the user is not a member of the specific user group, the content authorization mechanism determines if the user is a member of a general user group (step 1206). If the content authorization mechanism determines the user is a member of the general user group, the content authorization mechanism permits the user to view the unrestricted pages of this portal (step 1208). The unrestricted pages are pages that provide the user of the general user group with access to unrestricted category information and unrestricted content information. If the content authorization mechanism determines the user is not a member of the general user group, the content authorization mechanism does not permit the user to view the restricted pages or the unrestricted pages of this portal (step 1210). In this way, the content authorization mechanism insures that a user only views the content items which are authorized for the user.

Following the determination of what pages and portlets the content authorization mechanism will permit a user to view, the view component of the navigation portlet displays category information in the navigation portlet and the view component of the content viewer portlet displays content item information in the content viewer portlet. In response to a user action, such as action 442 in FIG. 4, on displayed category information in the navigation portlet, the controller component of the navigation portlet, such as controller component 406 of navigation portlet 402, sends a category identification to the controller component of the content viewer portlet, such as controller component 412 of content viewer portlet 404, to make sure that the content item information, such as content item information 426, retrieved by the content viewer portlet corresponds to the category information, such as category information 424, retrieved by the navigation portlet (step 1212). In response to a user action, such as action 444, on displayed content item information in the content viewer portlet, the controller component of the content viewer portlet sends a category identification to the controller component of the navigation portlet to make sure that the category information retrieved by the navigation portlet corresponds to the content item information retrieved by the content viewer portlet (step 1214).

Thus, the aspects of the present invention provide a computer implemented method, apparatus, and computer usable program code for navigating content in a portal. The aspects of the present invention uses two portlets to create a navigation box in one portlet and display associated content items in another portlet. A user uses the navigation box in the navigation portlet to navigate content items in the content viewer portlet. This intuitive navigation box makes it much easier for a user to navigate content items retrieved from a content management system in a portal. Applying this pattern for navigating content in a portal will also save time and cost for creating such a content viewer portlet for a content management portal project.

Altogether, the components and process as shown in FIGS. 4 and 12 provide a pattern for navigating content in a portal.

The invention can take the form of an entirely hardware embodiment, an entirely software embodiment, or an embodiment containing both hardware and software elements. In an illustrative embodiment, this invention is implemented in software, which includes but is not limited to firmware, resident software, microcode, etc.

Furthermore, this invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor, a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for navigating content presented by portlets, the computer implemented method comprising:

providing both a navigation portlet and a content viewer portlet for a portal, wherein said navigation portlet and said content viewer portlet each comprises a model component configured to obtain information for the portal, a view component configured to display the information obtained by the model component, and a controller component configured to update the information displayed by the view component;

obtaining, by the model component of the navigation portlet, category information for the portal from a content management system, wherein the category information is a classification assigned to a content item that indicates a higher level grouping to which the content item belongs;

displaying, by the view component of the navigation portlet, the category information in the navigation portlet to form displayed category information;

obtaining, by the model component of the content viewer portlet, content information for the portal from the content management system, wherein the content information is information that includes content items associated with a specific category of the category information;

displaying, by the view component of the content viewer portlet, the content information in the content viewer portlet to form displayed content information;

in response to a user action selecting a category from the displayed category information in the navigation portlet, operating the controller component of the navigation portlet to update the displayed category information in the navigation portlet and send an update message from the controller component of the navigation portlet to the controller component of the content viewer portlet to update the displayed content information in the content viewer portlet;

in response to the controller component of the content viewer portlet receiving the update message from the controller component of the navigation portlet, updating, by the view component of the content viewer portlet, the displayed content information in the content viewer portlet;

in response to a user action selecting content from the displayed content information in the content viewer portlet, operating the controller component of the content viewer portlet to update the displayed content information in the content viewer portlet and send another update message from the controller component of the content viewer portlet to the controller component of the navigation portlet to update the displayed category information in the navigation portlet;

in response to the controller component of the navigation portlet receiving the another update message from the controller component of the content viewer portlet, updating, by the view component of the navigation portlet, the displayed category information in the navigation portlet;

wherein operating the controller component of the navigation portlet to update the display category information in the navigation portlet comprises sending, by the controller component of the navigation portlet, a request to the model component of the navigation portlet to obtain additional category information from the content management system that is coupled to both the navigation portlet and the content viewer portlet; and wherein operating the controller component of the content viewer portlet to update the display content information in the content viewer portlet comprises sending, by the controller component of the content viewer portlet, a request to the model component of the content viewer portlet to obtain additional content information from the content management system such that a user uses the category information in the navigation portlet to navigate to the content information displayed in the content viewer portlet.

2. The computer implemented method of claim 1, wherein the update message sent by the controller component of the navigation portlet to the controller component of the content viewer portlet includes an identification of the selected category.

3. A portal application system comprising:
   a processor configured to implement:
      a navigation portlet provided for a portal; and
      a content viewer portlet provided for the portal, wherein said navigation portlet and said content viewer portlet each comprises a model component, a view component and a controller component, and wherein the view component of the navigation portlet displays category information obtained by the model component of the navigation portlet from a content management system to form displayed category information, wherein the category information is a classification assigned to a content item that indicates a higher level grouping to which the content item belongs, and the view component of the content viewer portlet displays content information obtained by the model component of the content viewer portlet from the content management system to form displayed content information, wherein the content information is information that includes content items associated with a specific category of the category information;
   wherein the controller component of the navigation portlet is operable to update the displayed category information in the navigation portlet, and is further operable to send an update message to the controller component of the content viewer portlet, in order to update the displayed content information in the content viewer portlet, in response to a user action selecting a category from displayed category information in the navigation portlet;
   wherein the view component of the content viewer portlet is operable to update the displayed content information in the content viewer portlet, in response to controller component of the content viewer portlet receiving the update message from the controller component of the navigation portlet;
   wherein the controller component of the content viewer portlet is operable to update the displayed content information in the content viewer portlet, and is further operable to send another update message to the controller component of the navigation portlet, in order to update the displayed category information in the navigation portlet, in response to a user action selecting content from displayed content information in the content viewer portlet;
   wherein the view component of the navigation portlet is operable to update the displayed category information in the navigation portlet, in response to controller component of the navigation portlet receiving the another update message from the controller component of the content viewer portlet;
   wherein operating the controller component of the navigation portlet to update the display category information in the navigation portlet comprises sending, by the controller component of the navigation portlet, a request to the model component of the navigation portlet to obtain additional category information from the content management system that is coupled to both the navigation portlet and the content viewer portlet; and wherein operating the controller component of the content viewer portlet to update the display content information in the content viewer portlet comprises sending, by the controller component of the content viewer portlet, a request to the model component of the content viewer portlet to obtain additional content information from the content management system.

4. The portal application system of claim 3, wherein the update message sent by the controller component of the navigation portlet to the controller component of the content viewer portlet includes an identification of the selected category.

5. A computer program product for navigating content presented by portlets, the computer program product comprising:
- a non-transitory computer usable storage medium having computer usable program code embodied therein;
- the computer usable program code configured to obtain category information for a portal that is provided with a navigation portlet and a content viewer portlet, wherein said navigation portlet and said content viewer portlet each comprises a model component, a view component and a controller component, and the category information is obtained by the model component of the navigation portlet from a content management system, wherein the category information is a classification assigned to a content item that indicates a higher level grouping to which the content item belongs;
- the computer usable program code configured to display the category information in the navigation portlet by the view component of the navigation portlet to form displayed category information;
- the computer usable program code configured to obtain content information by the model component of the content viewer portlet from the content management system, wherein the content information is information that includes content items associated with a specific category of the category information;
- the computer usable program code configured to display, by the view component of the content viewer portlet, the content information in the content viewer portlet to form displayed content information;
- the computer usable program code configured to operate the controller component of the navigation portlet to update the displayed category information in the navigation portlet, in response to user action selecting a category from the displayed category information in the navigation portlet and send an update message from the controller component of the navigation portlet to the controller component of the content viewer portlet, to update the displayed content information in the content viewer portlet;
- the computer usable program code configured to operate the view component of the content viewer portlet to update the displayed content information in the content viewer portlet, in response to controller component of the content viewer portlet receiving the update message from the controller component of the navigation portlet;
- the computer usable program code configured to operate the controller component of the content viewer portlet to update the displayed content information in the content viewer portlet, in response to user action selecting content from the displayed content information and send another update message from the controller component of the content viewer portlet to the controller component of the navigation portlet, to update the displayed category information in the navigation portlet;
- the computer usable program code configured to operate the view component of the navigation portlet to update the displayed category information in the navigation portlet, in response to controller component of the navigation portlet receiving the another update message from the controller component of the content viewer portlet;
- wherein operating the controller component of the navigation portlet to update the display category information in the navigation portlet comprises sending, by the controller component of the navigation portlet, a request to the model component of the navigation portlet to obtain additional category information from the content management system that is coupled to both the navigation portlet and the content viewer portlet; and
- wherein operating the controller component of the content viewer portlet to update the display content information in the content viewer portlet comprises sending, by the controller component of the content viewer portlet, a request to the model component of the content viewer portlet to obtain additional content information from the content management system.

6. The computer program product of claim 5, wherein the update message sent by the controller component of the navigation portlet to the controller component of the content viewer portlet includes an identification of the selected category.

* * * * *